United States Patent [19]
Phelps

[11] 4,111,225
[45] Sep. 5, 1978

[54] SEWAGE DISPOSAL METHOD AND SYSTEM

[76] Inventor: Charles W. Phelps, 235 Valley Ave., Williamsport, Pa. 17701

[21] Appl. No.: 713,206

[22] Filed: Aug. 10, 1976

[51] Int. Cl.² .............................................. B08B 9/08
[52] U.S. Cl. .................................. 137/240; 137/592; 137/565
[58] Field of Search ................. 137/205, 565, 240, 15, 137/590, 592, 565; 134/167 R

[56] References Cited
U.S. PATENT DOCUMENTS

| | | | |
|---|---|---|---|
| 3,101,730 | 8/1963 | Harris | 134/167 R |
| 3,444,869 | 5/1969 | Guignon | 134/167 R |
| 3,706,319 | 12/1972 | Neese | 137/205 |

Primary Examiner—Alan Cohan
Attorney, Agent, or Firm—Lowe, King, Price & Markva

[57] ABSTRACT

A mobile tank mounted on a set of wheels is hitchable to the back of a vehicle for transport between a camping area and a remote sewage area. A plurality of cleaning nozzles, interconnected by a conduit, are disposed along the top of the tank. The nozzles extend through apertures in the tank wall to the inside of the tank with sets of nozzle orifices oriented adjacent the inner wall surface. Sewage is removed on-site from each of a plurality of campers or other sewage sources at the camping area and transferred into the tank. The tank is then transported to the remote sewage disposal area for emptying. The inside of the tank is cleaned by supplying water under pressure to the conduit. Water from the nozzle orifices is sprayed against the inner wall surface of the tank. The spray tends to cut into solid sewage caked on the inner wall, and a downwardly flowing film of water established on the inner wall surface washes the sewage out a tank outlet.

10 Claims, 8 Drawing Figures

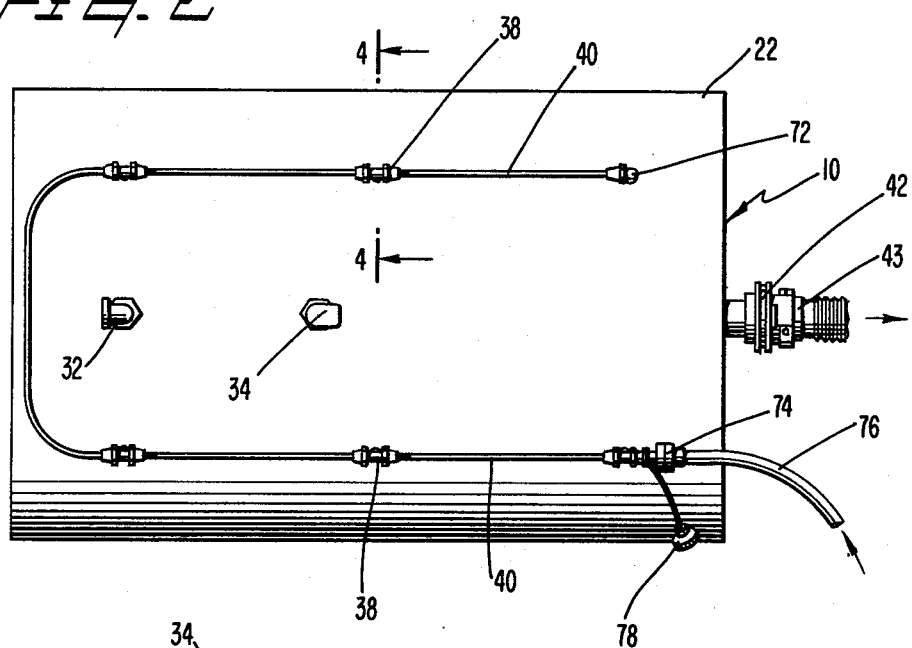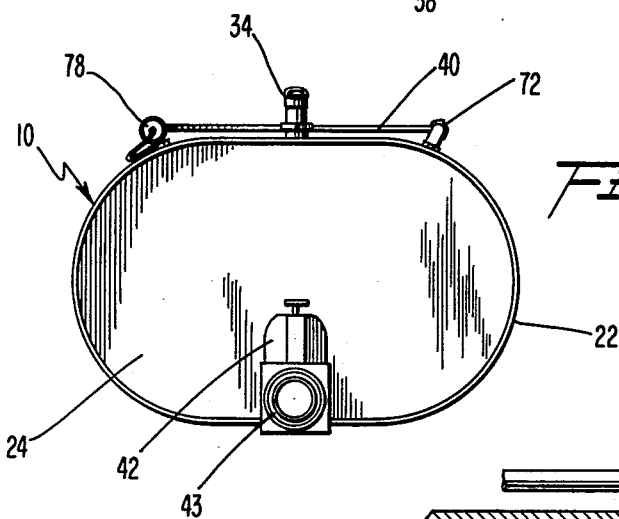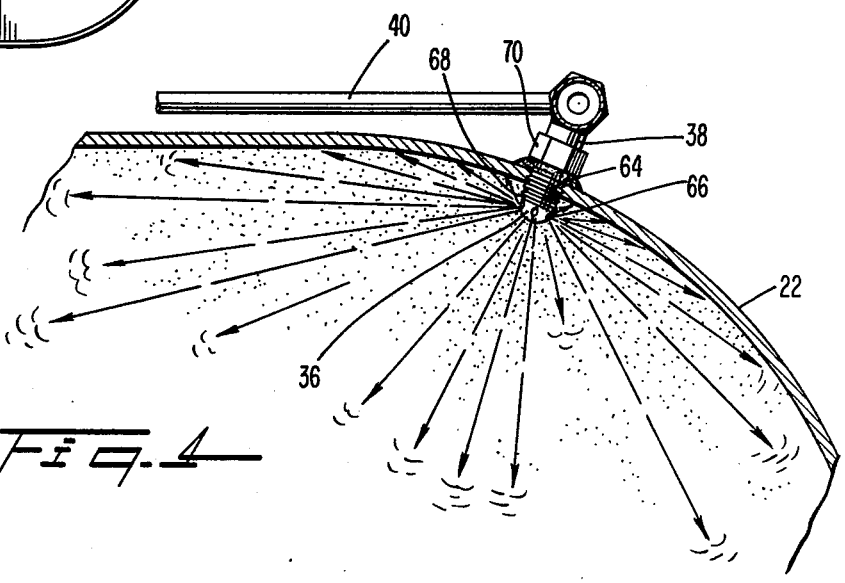

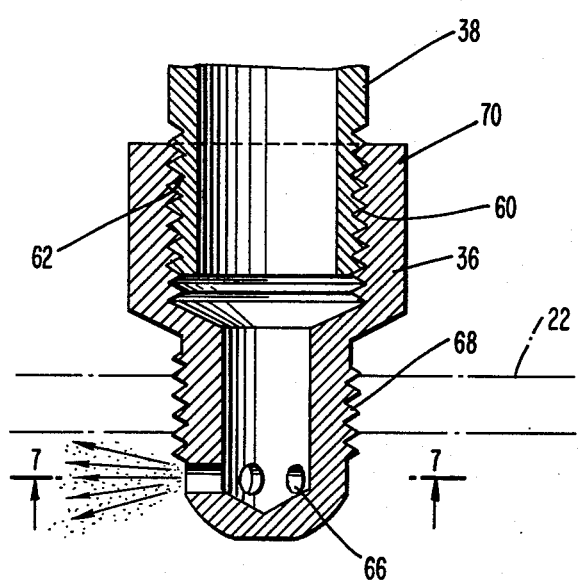
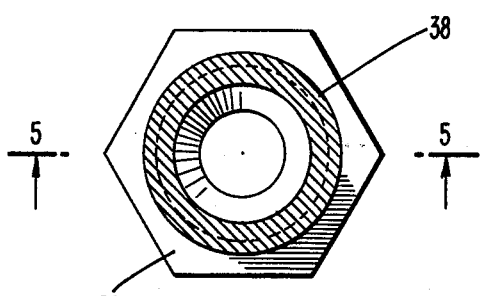
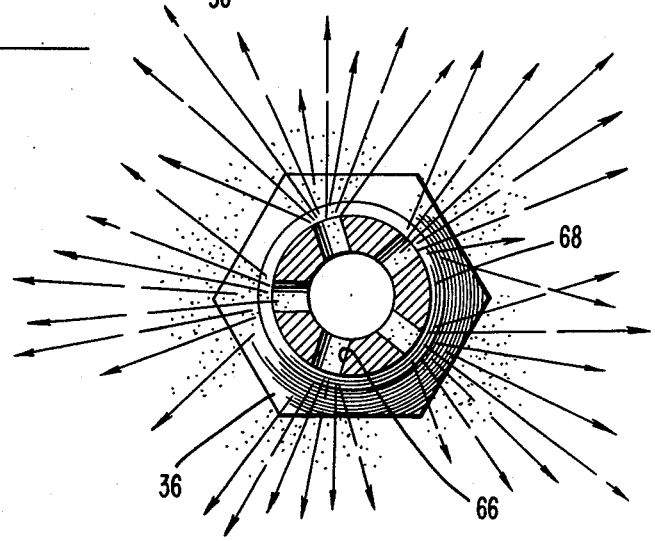
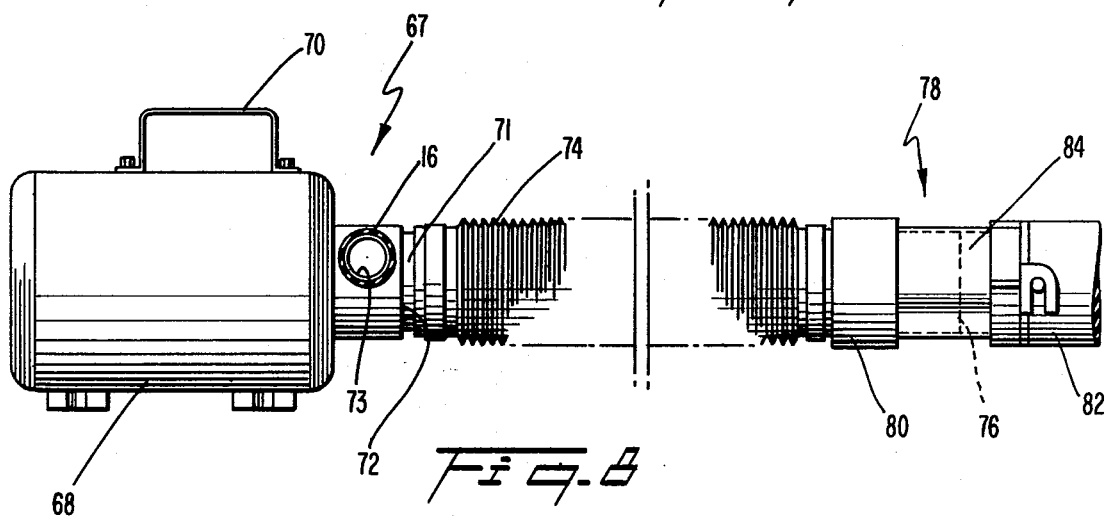

SEWAGE DISPOSAL METHOD AND SYSTEM

BACKGROUND OF THE INVENTION

The present invention relates generally to a method of and system for removing sewage from a plurality of sewage sources, and more particularly to on-site sewage removal wherein sewage is collected from the holding tanks of a plurality of campers at a campground, and transported to a remote septic system for emptying.

The typical large campground for mobile homes, campers, trailers and the like, includes a local septic system permitting campers to dispose of accumulated sewate. Smaller campgrounds, however, do not have their own septic system. The campers must, from time to time, transport the homes or units to a designated area, e.g., remote septic system, for dumping sewage. Since the camper must tear down his jacks and awnings in order to move to the sewage dumping area, the camper is apt to not return to the smaller campground, that is, the camper will probably go to a campground providing sewage disposal facilities.

It is generally impossible for the small campground owner to provide sewage disposal facilities to campers due to the high costs involved and zoning problems. The small campground owner is therefore at a competitive disadvantage, and substantial revenues are lost each year for this reason. A need presently exists for providing sewage disposal capability to campgrounds that are not equipped with on-site septic systems.

Accordingly, one object of the present invention is to provide a new and improved sewage disposal system for campgrounds.

Another object of the invention is to provide sewage disposal for campgrounds that do not have their own sewage disposal system.

Still another object of the invention is to provide sewage disposal capability at campgrounds, wherein sewage is evacuated from mobile homes, campers, trailers and the like, without the requirement of relocation.

BRIEF DESCRIPTION OF THE INVENTION

Briefly, in accordance with the invention, a mobile tank is mounted on a frame containing a set of wheels and a hitch for attachment to a transporting vehicle. An inlet, located at the top of the tank, is attachable to one end of a hose that is extended to each mobile home or camper for sewage evacuation. At the opposite end of the hose, a pumping unit is provided for attachment to the holding tank outlet of the mobile home or trailer for pumping sewage to the mobile tank. A transparent viewer on the attachment provides a visual display of sewage flow. When not in use, the attachment and hose are supported on a horizontal platform attached to the frame adjacent the front of the mobile tank. At the bottom of the tank, an outlet is provided for dumping the sewage at a designated disposal area. Output of sewage through the tank outlet is provided by gravity.

A plurality of nozzles, interconnected by a conduit, are distributed along the top of the tank in a U-shaped configuration. Each nozzle extends through the wall of the tank to the inside thereof, and contains a set of orifices adjacent the inner wall surface. Water or other fluid cleaner, supplied to the conduit, is forced through the orifices of each nozzle at the inner wall surface. A spray of water, impinging on the inner wall surface, tends to cut away solids impacted on the wall. A continuous film of water flowing downwardly along the wall surface washes the wall, loosening sewage particles, and the water and remaining sewage egress from the tank outlet.

Thus, the inner wall surface of the tank is thoroughly cleaned in minimum time and using a minimum amount of water. This is in contrast with conventional tank cleaning systems of which I am aware in which a tank is first substantially filled with water and then flushed. Therein, the cleaning of the inner wall is incomplete because there is no "cutting action" with respect to impacted solids, and build-up of solid sewage on the wall tends to occur.

Accordingly, another object of the invention is to provide a new and improved method of and system for cleaning the inner wall of a sewage holding tank.

Another object is to provide a method of and system for cleaning a sewage holding tank in minimum time and using minimum water or other fluid cleaner.

Still other objects and advantages of the present invention will become readily apparent to those skilled in the art from the following detailed description, where I have shown and described only the preferred embodiment of the invention, simply by way of illustration of the best mode contemplated by me of carrying out my invention. As will be realized, the invention is capable of other and different embodiments, and its several details are capable of modification in various obvious respects, all without departing from the invention. Accordingly, the drawings and description are to be regarded as illustrative in nature, and not as restrictive.

BRIEF DESCRIPTION OF THE DRAWING

FIG. 2 is a top view of the mobile tank showing the cleaning nozzles and interconnecting conduit;

FIG. 3 is an end view of the holding tank;

FIG. 4 is a partial cross-sectional view of the holding tank taken along the line 4—4 in FIG. 2 showing the cleaning action provided by one cleaning nozzle at the inner wall surface;

FIG. 5 is a cross-sectional side view of a cleaning nozzle and connector;

FIG. 6 is an end view of the nozzle of FIG. 5;

FIG. 7 is a cross-sectional view of the nozzle taken along the line 7—7 in FIG. 5; and FIG. 8 is a side view of the pumping attachment showing the transparent viewing window.

DETAILED DESCRIPTION OF A SPECIFIC EMBODIMENT

Figure 1:
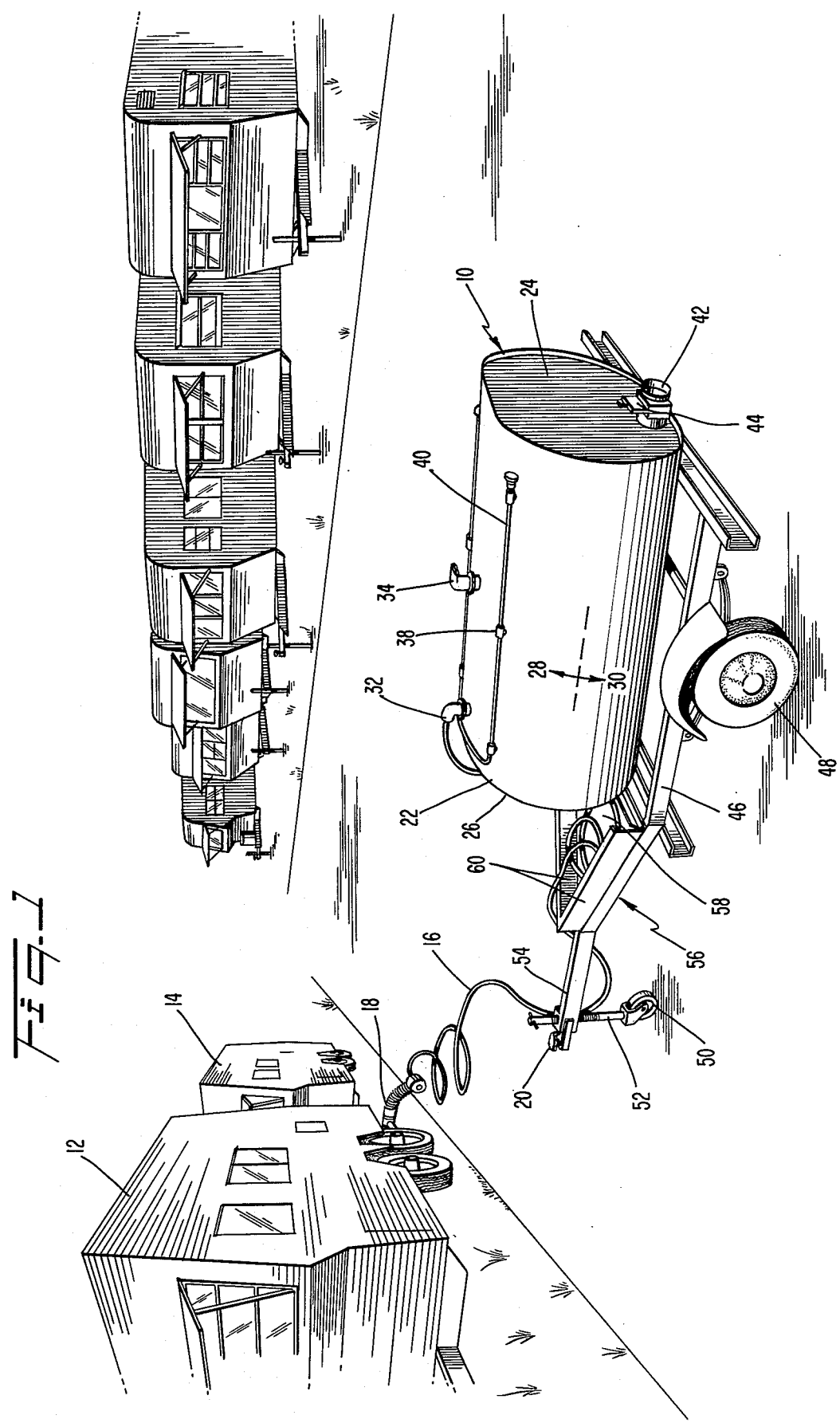
FIG. 1 is a perspective view of a holding tank in accordance with the invention, in operation at a campsite.

Referring to FIG. 1, a mobile sewage collection tank 10 is shown located in a campground having a plurality of campers, trailers or mobile homes, such as those designated by the numerals 12 and 14. A hose 16 having a pumping unit or attachment 18 at one end of the hose is extended between the trailer 12 and mobile tank 10. As discussed in more detail below, sewage from the holding tank ( not shown ) of trailer 12 is being transferred to mobile tank 10. Similarly, the holding tanks of other mobile homes, trailers of campers such as trailer 14, are successively emptied into the tank 10 through hose 16. When tank 10 is filled to capacity with sewage, the tank is attached to a vehicle (not shown) at hitch 20, and is transported to a designated disposal area for emptying and cleaning.

Referring now to FIG. 1 in more detail, tank 10 is comprised of a horizontally disposed, approximately cylindrical tank body 22 having end walls 24 and 26. The tank body 22 can be considered to have an upper portion designated generally by 28 and a lower portion designated generally by 30 (see dotted line). On the upper portion 28, there is located an inlet 32 for receiving sewage pumped thereto through hose 16 by pumping unit 18. One end of the hose 16 is connected to inlet 32 with a conventional coupling (not shown in detail). The upper portion 28 also contains a vent 38 to permit escape of gases released by decomposition of sewage within the tank 10.

A plurality of nozzles 36 (see FIG. 4) are distributed along the upper portion 28 of the tank body 22. The nozzles 36 extend through the wall of tank body 22, and each is attached to a connector 38.

Referring to FIG. 4, the connectors 38 are located adjacent the outer wall surface of tank body 22. Conduit 40, interconnecting the connectors 38, may be formed of copper or plastic tubing, for example. The conduit 40 is located on the upper portion 28 of tank body 22 in approximately a U-shaped configuration (see FIG. 2).

An outlet 42 is disposed on tank 24 at the lower tank body portion 30. Outlet 42, normally closed by valve 44, is opened for emptying the tank 10 of sewage at the disposal area. Drainage of the sewage is provided by flexible tube 43 coupled to the end of outlet 42. With valve 44 in the open position, the sewage drains from the tank at outlet 42 under the force of gravity.

The tank body 22 is mounted to a frame 46 having a rear set of wheels 48 (only one wheel is visible in FIG. 1), and a forward wheel 50. The forward wheel 50 is located to the rear of trailer hitch 20 provided for attachment to a transporting vehicle (not shown). The forward wheel 50 is mounted to a threaded shaft 52 in stem 54 of the frame 46. Rotation of wheel shaft 52 provides vertical adjustment of the hitch 20 in a conventional manner.

Between the tank body 22 and stem 54, a storage region 56 comprising horizontal platform 56 and side rails 58 is provided for storing hose 16 and pumping attachment 18 when not in use. The storage region is particularly convenient for storing the hose 16 and pumping attachment 18 when the tank 10 is being pulled by the transporting vehicle.

Referring to FIGS. 2–4, conduit 40, disposed along a U-shaped path on the upper portion 28 on top of tank body 22, is attached to adjacent connectors 38. The conduit 40 and connectors 38 are located adjacent the outer surface of the tank body 22. Each connector 38 (see FIG. 5) contains a threaded stem 60 that mates with threaded bore 62 in a collar portion 70 of nozzle 36. The cleaning nozzles 36 in turn are located within threaded apertures 64 (FIG. 4) in tank body 22 with threaded end portion 68, and extend into the body 22 along a line normal to the body surface.

Each of the cleaning nozzles 36 contains a set of spray orifices 66 (see also FIGS. 5 and 7) on the threaded end portion 68 of the nozzle. The nozzles 36 are mounted within the threaded apertures 64 on tank body 22, as aforementioned, with collar 70 abutting the outer surface thereof, and are sealed against leakage by RTV or other sealant material. Connectors 38 are then threaded into bore 62 of each nozzle in collar 70, and segments of the conduit 40 are coupled to adjacent connectors 38, as shown in FIG. 2.

Still referring to FIG. 2, one end of conduit 40 is enclosed by an end fixture 72 and the other end contains a hose coupling 74. The hose coupling 74 is provided to receive a cleaning hose 76 connected to a source (not shown) of water or other cleaning fluid. A plug 78 is tied to coupling 74, and serves to close off the coupling when the cleaning hose 76 is detached therefrom.

As water is applied to conduit 40 at coupling 74 under pressure, a spray of the water is created at orifices 66 (see FIGS. 4, 5 and 7) inside tank body 22 distributing the water around each nozzle 36, as shown. Water is directed from orifices 66 so as to impinge at high velocity on the inner wall surface of tank body 22, as best seen in FIG. 4. The action of the water impinging in the inner wall of tank body 22 tends to cut away solids that may be impacted on the inner wall surface and also provides a continuous, downwardly flowing film of water effecting a "scrubbing action" to wash the solids toward drain outlet 42.

The combined action of the high velocity spray impinging on the inner wall surface of tank body 22 and downwardly flowing water film is responsible for scrubbing the inner wall surface while minimizing consumption of water. This is in contrast to "fill and flush" cleansing systems of which I am aware. In those systems, cleaning of the inner wall surface of the tank is incomplete because there is no "scrubbing action" of water on the inner wall surface, and a substantial amount of water is required for filling the tank. Furthermore, in the present invention, the film or curtain of water flowing downwardly along the inner wall surface of body 22 tends to loosen any solid material that may cling to the wall, and has a polishing effect. I have found that in a typical application the "fill and flush" system consumes 275 gallons of water and puts 275 gallons of water into the septic system at the designated disposal area. In contrast, in the present system, approximately 10 gallons of water or other cleaning fluid are required, and cleaning of the tank is more complete.

Referring now to FIG. 8, pumping attachment 67, in accordance with the present invention, comprises a hand-held pump 68 having a handle 70 and an inlet 72 coupled to one end 71 of a flexible conduit 74. An outlet 73 of the pump 68 is coupled to hose 16. The opposite end 76 of conduit 74 is coupled to a special adapter 78 that is attachable to an outlet of a conventional camper or mobile home sewage holding tank (not shown). Adapter 78 contains a collar 80 for holding the adapter to the flexible conduit 74 and a bayonet connector 82 for attachment of the adapter to the outlet of a conventional holding tank. Between the collar 80 and connector 82, there is provided a transparent window for viewing evacuation of sewage from the holding tank of the camper or trailer to the tank 10.

In use, after attachment of the connector 82 to the holding tank of the camper or trailer, pump 68 is turned on and sewage is pumped from the holding tank through flexible conduit 74 and hose 16 to mobile tank 10. As soon as evacuation of sewage is complete, as indicated by transparent window 84, the pump 68 is turned off, the connector 82 is disconnected from the holding tank, and the attachment 67 is transferred to another camper or trailer. The transparent window expedites the entire operation because the connector 82 can be de-coupled from the holding tank the moment evacuation is complete; no time is wasted in draining an empty holding tank.

Tank 10 is wheeled along the campground successively into position with each camper or trailer to be evacuated. After the holding tanks of all campers or trailers have been evacuated, tank 10 may be transported to another campground for further use, or to the designated area for emptying the tank of sewage and cleaning in the manner set forth above.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

What is claimed is:

1. A collection tank for sewage, comprising:
a tank body having an inlet for receiving sewage and an outlet for drainage;
nozzle means located within said tank adjacent an inner wall surface thereof, and directed so as to impinge a cleaning fluid on said inner wall surface, said nozzle means including a plurality of nozzles distributed along an upper portion of said tank body, each of said nozzles including a stem portion extending through the tank body and having discharge orifices adjacent said inner surface, said nozzle means further including a conduit disposed along an outer surface of said tank body interconnecting said nozzles; and means for supplying the cleaning fluid to said nozzle means from a source of the fluid located outside said tank body.

2. The tank as defined in claim 1, including wheel means for movably supporting said tank body.

3. The tank as defined in claim 1, including tube means engageable with said inlet for transferring the sewage from said sources to said tank.

4. The tank as defined in claim 3, including platform means on said tank body for carrying said tube means.

5. The tank as defined in claim 4, wherein said tank body is mounted on a frame, and said wheel means includes a pair of rear wheels attached to said frame, and a third wheel attached to a forward end of said frame, said platform means including a horizontal platform located on said frame between said forward end and said tank body.

6. The tank as defined in claim 5, wherein said inlet is located on top of said tank body adjacent said platform.

7. The tank as defined in claim 1, wherein one end of said conduit includes an inlet for receiving cleaning fluid, a removable plug member attachable to said one end, an opposite end of said tube being closed.

8. The tank as defined in claim 3, wherein said tube means includes a pump for pumping sewage from said source to said inlet.

9. The tank as defined in claim 8, wherein said tube means further includes window means for monitoring sewage flow.

10. The tank of claim 1, wherein said plurality of nozzles are distributed on the upper portion of said tank body in an approximated U-shaped configuration.

* * * * *